United States Patent [19]

Holmberg

[11] Patent Number: 4,658,542
[45] Date of Patent: Apr. 21, 1987

[54] PORTABLE GROWING SYSTEM

[76] Inventor: Douglas A. Holmberg, 1321 N. Valrico, Valrico, Fla. 33954

[21] Appl. No.: 831,820

[22] Filed: Feb. 24, 1986

[51] Int. Cl.⁴ ............................................. A01G 9/02
[52] U.S. Cl. ......................................... 47/86; 47/85
[58] Field of Search .................. 47/85, 86, 87, 81, 84, 47/63, 48.5

[56] References Cited

U.S. PATENT DOCUMENTS

| | | | |
|---|---|---|---|
| 3,871,131 | 3/1975 | Berglund | 47/81 |
| 3,889,416 | 6/1975 | Bergeron et al. | 47/86 |
| 4,453,344 | 6/1984 | Van Wingerden | 47/85 |
| 4,495,725 | 1/1985 | Talbott | 47/86 |

FOREIGN PATENT DOCUMENTS

| | | | |
|---|---|---|---|
| 111786 | 10/1968 | Denmark | 47/86 |
| 48501 | 1/1985 | PCT Int'l Appl. | 47/86 |
| 2085702 | 5/1982 | United Kingdom | 47/87 |
| 2088186 | 6/1982 | United Kingdom | 47/87 |

Primary Examiner—Robert A. Hafer
Assistant Examiner—Bradley M. Lewis
Attorney, Agent, or Firm—A. W. Fisher, III

[57] ABSTRACT

A portable growing system for propagating seedlings or rooting cuttings comprising an upper propagation tray configured to receive a plurality of seedlings or rooting cuttings and a lower support bench configured to support the upper propagation tray above the ground or other supporting surface, the upper propagation tray comprising a tray member having an outer peripheral support ledge formed about the periphery thereof and plurality of propagation cells each having a centrally disposed aperture formed in the lower portion thereof to receive individual seedlings or rooting cuttings formed inwardly of the outer peripheral support ledge and the lower support bench comprising a pair of side walls held in fixed spaced relationship relative to each other by a pair of end walls and a lattice floor, the upper surfaces of the pair of side walls and pair of end walls cooperatively forming an upper peripheral support surface to support the outer peripheral support ledge, the pair of side walls and the pair of end walls including a plurality of openings formed therein whereby the upper propagation tray is supported within the lower support bench such that the seedlings or rooting cuttings disposed within the plurality of propagation cells are provided drainage and air pumping through the centrally disposed apertures and through the side openings and lattice floor of the lower support bench.

14 Claims, 7 Drawing Figures

U.S. Patent  Apr. 21, 1987  4,658,542
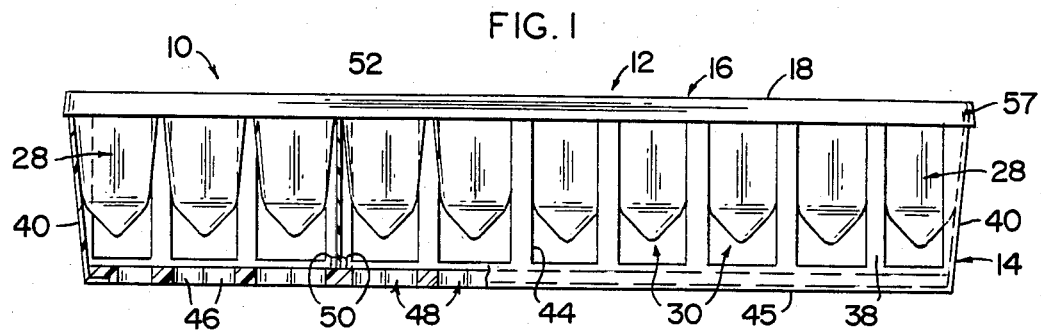
FIG. 1
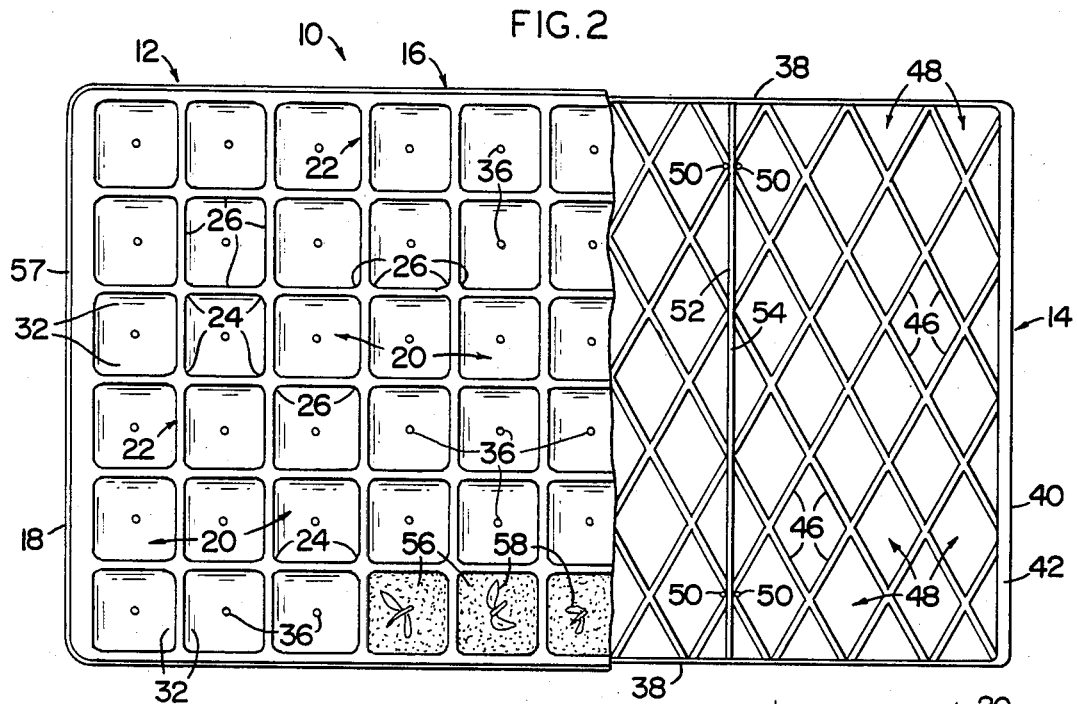
FIG. 2
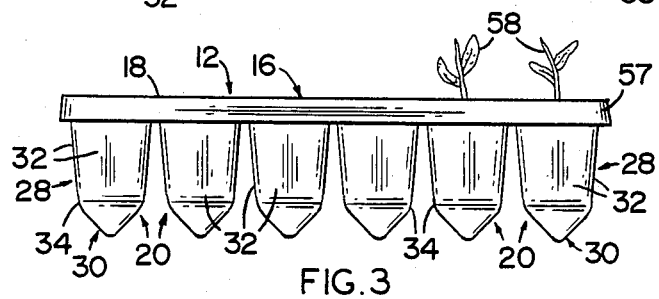
FIG. 3
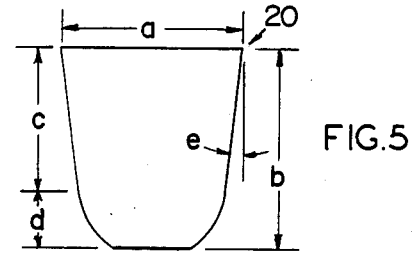
FIG. 5
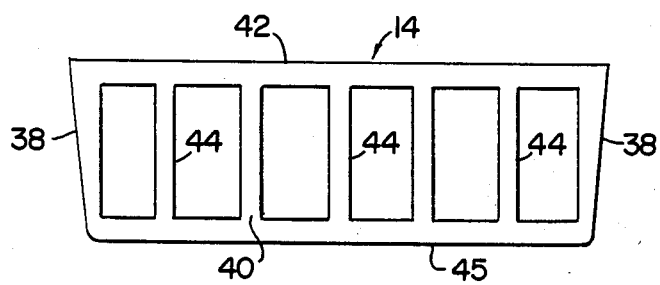
FIG. 4
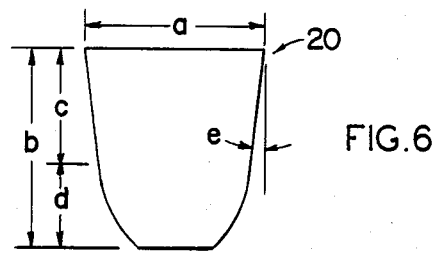
FIG. 6
FIG. 7

PORTABLE GROWING SYSTEM

BACKGROUND OF THE INVENTION

1. Field of the Invention

A portable growing system for propagating seedlings or rooting cuttings comprising an upper propagation tray configured to receive a plurality of seedlings on rooting cuttings therein and a lower support bench configured to receive and support the upper propagation tray above the ground or other supporting surface.

2. Description of the Prior Art

Commonly commercial nursery and farming operations entail the transplanting of millions of seedlings and rooting cuttings each year. These plants are normally started from seeds or cuttings in a controlled environment such as a hothouse and, upon reaching a desired size, the plants are transplanted for field growth or longer container growth in larger containers. Growing trays are generally used for initial growth of the plants for subsequent transplanting into a field or into larger containers for further growth.

The labor involved in providing the seedlings or rooting liners to the user represents a substantial cost factor. Thus a number of trays specifically designed for holding the individual pots have been conceived for this purpose. Unfortunately such trays are often excessively costly, labor involved in producing the liners is great, and the percentage of plants that survive is low because of configuration of the cells causing poor drainage. Also plants grown to their potential size normally become potbound and grow off poorly as a result of that condition.

Moreover removal of the seedlings for transplanting is sometimes difficult and may result in damage to the seedlings. Thus containers are made of material that is directly transplanted into the ground with the seedlings. Unfortunately these devices do not posses rigidity necessary for easy handling without the aid of additional auxiliary support trays.

Moreover, the use of additional auxiliary support trays has been limited due to difficulty in providing sufficient drainage and air pruning.

Therefore, there remains a need for an economical and sturdy seedling flat for handling and having the capacity of permitting the easy removal of seedlings from the flat and allowing a greater degree of air and drainage, and having a configuration not conducive to causing this potbound condition.

Examples of such growing pots or trays are disclosed in the following patents: U.S. Pat. No. 752,370; U.S. Pat. No. 3,035,369; U.S. Pat. No. 3,164,507; U.S. Pat. No. 3,386,608; U.S. Pat. No. 3,561,158; U.S. Pat. No. 3,667,159; U.S. Pat. No. 3,736,889; U.S. Pat. No. 3,868,054; U.S. Pat. No. 3,889,416; U.S. Pat. No. 3,949,523; U.S. Pat. No. 3,992,810; U.S. Pat. No. 4,197,674 and U.S. Pat. No. Des. 185,652; and also German No. 1,941,315; Netherlands No. 6,908,126; and United Kingdom No. 1,034,256; and United Kingdom No. 2,007,952.

SUMMARY OF THE INVENTION

The present invention relates to a portable growing system for propagating seedlings or rooting cuttings comprising an upper propagation tray configured to receive a plurality of seedlings or rooting cuttings and a lower support bench configured to receive and support the upper propagation tray above the ground or other supporting surface.

The upper propagation tray comprises a tray member including an outer peripherial support ledge and a plurality of propagation cells formed inwardly of the outer peripherial support ledge. Each propagation cell comprises an upper opening, an intermediate potting portion and a lower concave or bulbous base including a centrally disposed aperture formed therein.

The lower support bench comprises a pair of side walls held in fixed spaced relationship relative to each other by a pair of end walls. The upper surfaces of the pair of side walls and the pair of end walls cooperatively form an upper tray support surface to engage and support the outer peripherial support ledge of the tray member. A plurality of enlarged openings is formed in the side walls and end walls. A bottom extends between the lower portions of the side walls and inwardly inclined end walls. The bottom forms a diamond shaped lattice of diagonally disposed members cooperatively forming a plurality of diamond shaped openings. Of course, other geometric configurations may be equally suitable.

Each individual propagation cell is configured to provide the volume of the media together with the media support, drainage, volume of cell, air pruning, and other structural elements that greatly enhances the growth rate of the seedlings or rooting cuttings and maximizes the efficient use of space within the greenhouse.

In use, the growing media is placed or poured into each propagation cell seedlings or cuttings. Once the plants have grown to the desired size, the plants and the growing media are removed from the upper propagation tray and transplanted into the ground or into a large container. Because of the width to height ratio, an optimum volume of media is provided with an optimum degree of drainage so that the upper foliar plant growth extending from the individual propagation cells may be disposed immediately adjacent the other propagation cell without interference, while maximizing desirable root development. Thus, the area of the greenhouse is used to maximum efficiency.

The engagement of the outer peripheral support ledge with the upper tray support surface supports the lower end of each propagation cell above the bottom. The lower support tray also provides rigidity of the upper propagation tray during use and movement from place to place.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 1 is a side view of the portable growing system.

FIG. 2 is a top view of the portable growing system, partially broken away to show the lower support bench.

FIG. 3 is a end view of the upper propagation tray.

FIG. 4 is an end view of the lower support bench.

FIG. 5 is an alternate embodiment of the propagation cell.

FIG. 6 is an alternate embodiment of the propagation cell.

FIG. 7 is an alternate embodiment of the propagation cell.

Similar reference characters refer to similar parts throughout the several views of the drawings.

DETAILED DESCRIPTION OF THE PREFERRED EMBODIMENT

As shown in FIG. 1, the present invention relates to a portable growing system generally indicated as 10 for propagating seedlings or rooting cuttings comprising an upper propagation tray generally indicated as 12 configured to receive a plurality of seedlings or rooting cuttings and a lower support bench generally indicated as 14 configured to receive and support the upper propagation tray 12 above the ground or other supporting surface.

As best shown in FIGS. 2 and 3, the upper propagation tray 12 comprises a substantially rectangular tray member generally indicated as 16 including an outer peripherial support ledge 18 and a plurality of propagation cells each generally indicated as 20 formed inwardly of the outer peripherial support ledge 16. Each propagation cell 20 comprises an upper substantially square opening 22 with rounded corners 24 formed at the intersection of adjacent opening sides each indicated as 26, an intermediate potting portion generally indicated as 28 and a lower concave or bulbous base generally indicated as 30. Each intermediate potting portion 28 comprises four substantially flat, tapered or inwardly inclined intermediate side walls each indicated as 32 rounded or curved at the intersection 34 of adjacent substantially flat, tapered or inwardly inclined intermediate side walls 32. The lower concave or bulbous base 30 is arcuate in configuration and has an enlarged centrally disposed aperture 36 formed therein.

As shown in FIGS. 1, 2 and 4, the lower support bench 14 comprises a pair of inwardly inclined side walls each indicated as 38 held in fixed spaced relationship relative to each other by a pair of inwardly inclined end walls each indicated as 40. The upper surfaces of the pair of inwardly inclined side walls 38 and the pair of inwardly inclined end walls 40 cooperatively form an upper tray support surface 42 to engage and support the outer peripherial support ledge 18 of the substantially rectangular tray member 16. A plurality of enlarged substantially rectangular side openings each indicated as 44 is formed in the inwardly inclined side walls 38 and inwardly inclined end walls 40. A bottom generally indicated as 45 extends between the lower portions of the inwardly inclined side walls 38 and inwardly inclined end walls 40. The bottom 45 forms diamond shaped lattice floor of diagonally disposed members each indicated as 46 cooperatively forming a plurality of diamond shaped openings each indicated as 48. In addition, at least one pair of intermediate support pins each indicated as 50 may extend upwardly from intersecting diagonally disposed members 46 to selectively receive and engage the lower edge of a substantially vertical intermediate tray support 52 including an upper intermediate tray support surface 54.

In addition, as described more fully hereinafter, each individual propagation cell 20 is configured to provide the volume of the media together with the media support, drainage, volume of cell, air pruning, and other structural elements that greatly enhances the growth rate of the seedlings or rooting cuttings and maximizes the efficient use of space within the greenhouse.

Specifically, as shown in FIGS. 5 through 7 the width to height ratio that is a:b of each individual propagation cell 20 is preferably 1:1. However, it is envisioned that the width to height ratio, that is a:b, may be extended to 1:4 in order to provide the proper volume of the growing media 56. The ratio of the intermediate potting portion 28 to the lower concave or bulbous base (vertical) 30 that is c:d, may vary from 1:1 to 2:1. The cross-sectional dimension of the upper substantially square opening 22, that is a, to the enlarged centrally disposed aperture 36 is preferably greater than 2:1. This provides sufficient media support as well as air pruning and drainage. In addition, the slope of the lower bulbous base 30 mechanically causes development of a desirable root development that is not pot bound and will grow off readily in an efficient manner. The root system will have a much greater quantity of meristem areas from which new roots will come in abundance. As shown, the angle E is preferably from 1° to 5° but may be extended to no greater than 22° degrees providing a function of the volume within the individual propagation cells 20.

In use, the growing media 56 is placed or poured into each propagation cell 20 with seedlings or cuttings. Once the plants 58 have grown to the desired size, the plants 58 and the growing media 56 are removed from the upper propagation tray 12 and transplanted into the ground or into a larger container. Because of the width to height ratio, a:b, an optimum volume of media is provided with an optimum degree of drainage so that the upper foliar plant growth extending from the individual propagation cells 20 may be disposed immediately adjacent the other propagation cells without interference, while maximizing desirable root development. Thus, the area of the greenhouse is used to its maximum efficiency.

The engagement of the outer peripheral support ledge 18 with the upper tray support surface 42 supports the lower end of each propagation cell 20 above the bottom 45. The lower support tray 14 also provides rigidity of the upper propagation tray 12 during use and movement from place to place. When held in place by the intermediate support pins 50, the substantially vertical intermediate tray support 52 will support the intermediate portion of upper propagation tray 12. In addition a peripherical retaining skirt 57 extends downwardly from the outer edge of the outer peripherial support ledge 16 to engage the upper side portions of the pair of inwardly inclined side walls 38 and the pair of inwardly inclined end walls 40 to minimize horizontal deflection of the lower support bench 14.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A portable growing system for propagating seedlings or rooting cuttings comprising an upper propagation tray configured to receive a plurality of seedlings or rooting cuttings and a lower support bench configured to support said upper propagation tray above the ground or other supporting surface, said upper propagation tray comprising a tray member having an outer peripheral support ledge formed about the periphery thereof and plurality of propagation cells each having a centrally disposed aperture formed in the lower portion thereof to receive individual seedlings or rooting cuttings formed inwardly of the outer peripheral support ledge, said lower support bench comprising a pair of said walls held in fixed spaced relationship relative to each other by a pair of end walls and a lattice floor, the upper surfaces of said pair of the side walls and said pair of end walls cooperatively forming an upper peripheral support surface to support said outer peripheral support ledge and a peripheral retaining skirt extending downwardly from the outer edge of said outer peripheral support ledge to engage a portion of the outer surface of said pair of side walls and said pair of end walls to prevent deflection thereof under the weight of said upper propagation tray, said pair of said walls and pair of end walls including a plurality of side openings formed therein whereby said upper propagation tray is supported within said lower support bench such that the seedlings or rooting cuttings disposed within said plurality of propagation cells are provided drainage and air pruning through said enlarged centrally disposed apertures and through said side openings and said lattice floor or said lower support bench.

2. The portable growing system of claim 1 wherein each said propagation cell comprises an upper substantially square opening, an intermediate potting portion and a lower bulbous base.

3. The portable growing system os claim 2 wherein said lower bulbous base comprises a substantially concave configuration.

4. The portable growing system of claim 1 wherein the inner section of adjacent opening sides of said upper opening are rounded.

5. The portable growing system of claim 1 wherein each said intermediate potting portion comprises four substantially flat tapered intermediate side walls.

6. The portable growing system of claim 5 wherein the intersection of adjacent substantially flat tapered intermediate side walls are curved.

7. The portable growing system of claim 1 wherein said lattice floor comprises a plurality of diagonally disposed members cooperatively forming a plurality of diamond shaped openings in said lattice floor.

8. The portable growing system of claim 4 wherein the vertical dimension of said intermediate potting portion is substantially twice the vertical demension of said base.

9. The portable growing system of claim 7 wherein the ratio of the vertical dimension of said intermediate potting portion to said base is substantially two to one.

10. The portable growing system of claim 9 wherein the horizontal dimension of said opening is at least twice the horizontal dimension of said centrally disposed opening.

11. The portable growing system of claim 13 wherein the inclination of said side walls is substantially 1° to 5°.

12. A portable growing system for propagating seedlings or rooting cuttings comprising an upper propagation tray configured to receive a plurality of seedlings or rooting cuttings and a lower support bench configured to support said upper propagation tray above the ground or other supporting surface, said upper propagation tray comprising a tray member having an outer peripheral support ledge formed about the periphery thereof and plurality of propagation cells each having a centrally disposed aperture formed in the lower portion thereof to receive individual seedlings or rooting cuttings formed inwardly of the outer peripheral support ledge, said lower support bench comprising a pair of side walls held in fixed spaced relationship relative to each other by a pair of end walls and a lattice floor, the upper surfaces of said pair of the side walls and said pair of end walls cooperatively forming an upper peripheral support surface to support said outer peripheral support ledge and at least one pair of intermediate support pins formed on said lattice floor to receive a substantially vertical intermediate tray support including an upper intermediate support surface to support the mid portion of said upper propagation tray, said pair of side walls and pair of end walls including a plurality of side openings formed therein whereby said upper propagation tray is supported within said lower support bench such that the seedlings or rooting cuttings disposed within said plurality of propagation cells are provided drainage and air pruning through said enlarged centrally disposed apertures and through said side openings and said lattice floor of said lower support bench.

13. The portable growing system of claim 12 further including a peripheral retaining skirt extending downwardly from the outer edge of the said outer peripheral support ledge to engage a portion of the outer surfaces of said pair of side walls and said pair of end walls to prevent deflection thereof under the weight of said upper propagation tray.

14. A portable growing system for propagating seedlings or rooting cuttings comprising an upper propagation tray configured to receive a plurality of seedlings or rooting cuttings and a lower support bench configured to support said upper propagation tray above the ground or other supporting surface, said upper propagation tray comprising a tray member having an outer peripheral support ledge formed about the peripheral thereof and plurality of propagation cells each having a centrally disposed aperture formed in the lower portion thereof to receive individual seedlings or rooting cuttings formed inwardly of the outer peripheral support ledge, said lower support bench comprising a pair of side walls held in fixed spaced relationship relative to each other by a pair of end walls and a lattice floor, the upper surfaces of said pair of the side walls and said pair of end walls cooperatively forming an upper peripheral support surface to support said outer peripheral support ledge, a peripheral retaining skirt extending downwardly from the outer edge of said outer peripheral support ledge to engage a portion of the outer surface of said pair of side walls and said pair of end walls to prevent deflection thereof under the weight of said upper propagation tray and at least one pair of intermediate support pins formed on said lattice floor to receive a substantially vertical intermediate tray support including an upper intermediate support surface to support the mid portion of said upper propagation tray, said pair of side walls and pair of end walls including a plurality of side openings formed therein whereby said upper propagation tray is supported within said lower support bench such that the seedlings or rooting cuttings disposed within said plurality of propagation cells are provided drainage and air pruning through said enlarged centrally disposed apertures and through said side openings and said lattice floor of said lower support bench.

* * * * *